United States Patent
Wibbels

(10) Patent No.: US 11,409,220 B2
(45) Date of Patent: Aug. 9, 2022

(54) PRINT INDICIA FOR SKEW CORRECTION

(71) Applicant: Hewlett-Packard Development Company, L.P., Spring, TX (US)

(72) Inventor: Mark J. Wibbels, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,614

(22) PCT Filed: Jul. 11, 2019

(86) PCT No.: PCT/US2019/041420
§ 371 (c)(1),
(2) Date: May 31, 2021

(87) PCT Pub. No.: WO2021/006910
PCT Pub. Date: Jan. 14, 2021

(65) Prior Publication Data
US 2022/0004135 A1    Jan. 6, 2022

(51) Int. Cl.
*G03G 15/00* (2006.01)
*G06K 15/02* (2006.01)

(52) U.S. Cl.
CPC ......... *G03G 15/5062* (2013.01); *G03G 15/55* (2013.01); *G06K 15/027* (2013.01); *G03G 2215/00569* (2013.01)

(58) Field of Classification Search
CPC ............... G03G 15/5062; G03G 15/55; G03G 15/6558; G03G 15/6567; G03G 2215/00561; G03G 2215/00569; G06K 15/027; G06K 15/1882; G06K 15/1884; G06K 15/1885
See application file for complete search history.

(56) References Cited

U.S. PATENT DOCUMENTS

| | | | |
|---|---|---|---|
| 4,511,242 A | 4/1985 | Ashbee et al. |
| 4,912,491 A | 3/1990 | Hoshino et al. |
| 5,442,388 A | 8/1995 | Schieck |
| 6,052,552 A | 4/2000 | Ohsumi et al. |
| 6,118,950 A | 9/2000 | Wibbels et al. |
| 6,474,765 B2 | 11/2002 | Beauchamp |
| 6,490,421 B2 | 12/2002 | McIntyre |
| 7,548,326 B2 | 6/2009 | Fukushima |
| 8,308,264 B2 | 11/2012 | Sussmeier et al. |
| 9,180,695 B2 | 11/2015 | Kerxhalli et al. |

(Continued)

OTHER PUBLICATIONS

Vernier Concept, Dec. 18, 2018, 1 pg.

*Primary Examiner* — Carla J Therrien
(74) *Attorney, Agent, or Firm* — Mannava & Kang, P.C.

(57) ABSTRACT

According to examples, an apparatus may include a processor and a memory on which are stored machine-readable instructions that when executed by the processor, may cause the processor to print a first indicia at a first region on a first side of a print medium. The instructions may also cause the processor to print a second indicia at a second region on the first side of the print medium, in which the second region may be spaced a prescribed distance from the first region along a first edge of the print medium. In some examples, a relative position of the first indicia to the second indicia may correlate to a skew correction value for the first edge of the print medium.

15 Claims, 5 Drawing Sheets

(56) References Cited

U.S. PATENT DOCUMENTS

| | | | |
|---|---|---|---|
| 2013/0278967 A1* | 10/2013 | Wilen | H04N 1/0009 |
| | | | 358/1.16 |
| 2015/0241829 A1* | 8/2015 | Wakai | G03G 15/50 |
| | | | 399/72 |
| 2016/0257145 A1 | 9/2016 | Profaca et al. | |
| 2019/0230245 A1* | 7/2019 | Kurokawa | H04N 1/00702 |
| 2020/0167108 A1* | 5/2020 | Yamamoto | G03G 15/6567 |
| 2020/0167109 A1* | 5/2020 | Yamamoto | G06F 3/121 |
| 2020/0301332 A1 | 9/2020 | Imanishi | |

* cited by examiner

500

PRINT A FIRST SCALE ON A FIRST SIDE OF A PRINT MEDIUM
502

PRINT A SECOND SCALE ON THE FIRST SIDE OF THE PRINT MEDIUM IN WHICH THE FIRST SCALE IS TO OVERLAP THE SECOND SCALE WHEN THE PRINT MEDIUM IS FOLDED ALONG A FIRST EDGE OF THE PRINT MEDIUM
504

```
┌─────────────────────────────────────────────────┐
│     NON-TRANSITORY COMPUTER READABLE MEDIUM     │
│                      600                        │
│                                                 │
│   ┌─────────────────────────────────────────┐   │
│   │ CAUSE A PRINT ENGINE TO PRINT A FIRST   │   │
│   │ SCALE OF A VERNIER ON A FIRST EDGE OF   │   │
│   │           A PRINT MEDIUM                │   │
│   │                 602                     │   │
│   └─────────────────────────────────────────┘   │
│                                                 │
│   ┌─────────────────────────────────────────┐   │
│   │  CAUSE THE PRINT ENGINE TO PRINT A      │   │
│   │  SECOND SCALE OF THE VERNIER ON THE     │   │
│   │  FIRST EDGE OF THE PRINT MEDIUM, IN     │   │
│   │  WHICH THE FIRST SCALE IS TO OVERLAP    │   │
│   │  THE SECOND SCALE WHEN THE PRINT        │   │
│   │  MEDIUM IS FOLDED ALONG A FIRST EDGE    │   │
│   │                 604                     │   │
│   └─────────────────────────────────────────┘   │
│                                                 │
│   ┌─────────────────────────────────────────┐   │
│   │  CAUSE THE PRINT ENGINE TO PRINT A      │   │
│   │  THIRD SCALE OF A SECOND VERNIER ON     │   │
│   │  THE FIRST SIDE OF THE PRINT MEDIUM     │   │
│   │                 606                     │   │
│   └─────────────────────────────────────────┘   │
│                                                 │
│   ┌─────────────────────────────────────────┐   │
│   │  CAUSE THE PRINT ENGINE TO PRINT A      │   │
│   │  FOURTH SCALE OF THE SECOND VERNIER     │   │
│   │  ON THE FIRST SIDE OF THE PRINT         │   │
│   │  MEDIUM, IN WHICH THE THIRD SCALE IS    │   │
│   │  TO OVERLAP THE FOURTH SCALE WHEN       │   │
│   │  THE PRINT MEDIUM IS FOLDED ALONG A     │   │
│   │            SECOND EDGE                  │   │
│   │                 608                     │   │
│   └─────────────────────────────────────────┘   │
└─────────────────────────────────────────────────┘
```

*FIG. 6*

PRINT INDICIA FOR SKEW CORRECTION

BACKGROUND

Imaging devices may be used for printing or imaging on a print medium. An imaging device may process imaging data, which may be obtained from an external source, scanned at the imaging device, or retrieved from a storage, and may print an image on the print medium based on the processed imaging data. In order to print on the print medium, the imaging device may include mechanisms to feed the print medium to a print engine.

BRIEF DESCRIPTION OF THE DRAWINGS

Features of the present disclosure are illustrated by way of example and are not limited in the following figure(s), in which like numerals indicate like elements, in which:

FIG. 6 depicts a block diagram of an example computer readable medium that may have stored thereon machine readable instructions that when executed by a processor, may cause a print engine to print a vernier on a print medium for determining a skew correction value for the print medium.

DETAILED DESCRIPTION

Figure 1:
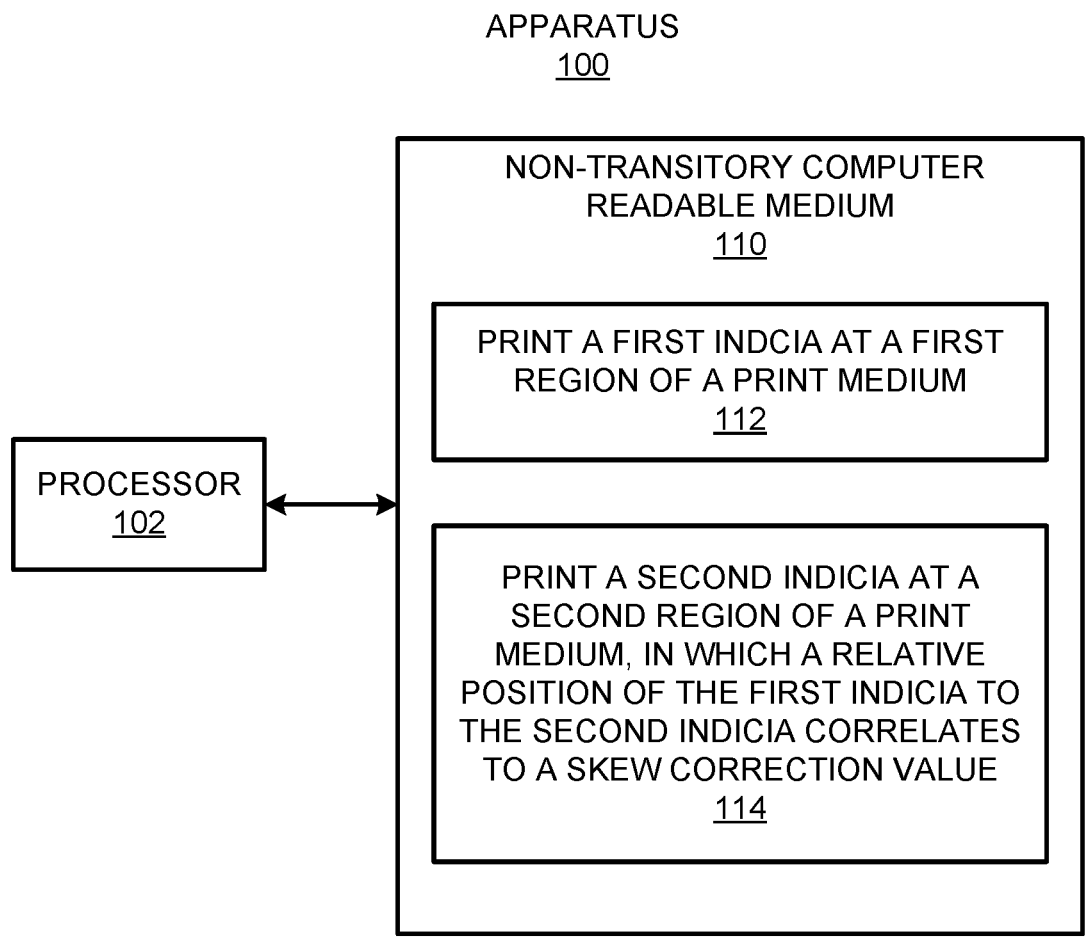
FIG. 1 depicts a block diagram of an example apparatus that may print indicia on a print medium, in which the indicia may indicate a skew correction value that may be used to identify a level of skew in the print medium.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In imaging devices, such as inkjet printers, laser printers, photocopiers, facsimile devices, or the like a print medium may be fed from a source and positioned relative to the print engine for printing. The print medium may include various types of materials such as opaque and transparent medium including paper sheets, plastic sheets such as transparencies, vellum sheets, envelopes, cardstock, or the like. In order to ensure proper alignment of the image on the print medium, the printer may include mechanisms for mechanical correction of image placement errors including, for example, lateral placement errors as well as skew. However, the mechanisms for mechanical correction may be costly and may introduce complexity to the printer. In particular, the components for mechanical correction of skew may be complex. As such, for low cost systems, mechanical correction of placement errors may be cost prohibitive.

In addition to mechanical correction, placement errors may be corrected using electronic image compensation methods. For example, once an amount of placement error is known, a value corresponding to the amount of placement error may be entered into the printer such that placement of the image may be digitally corrected during image processing. However, while this method does not require the mechanical components to mechanically correct placement errors, additional components, such as optical sensors or the like, may be used to detect the position of the print medium in order to calculate the amount of compensation required. These additional components may introduce cost and complexity to the printer, and may be cost prohibitive in low cost printers.

Disclosed herein are apparatuses, methods, and computer readable media for determining skew correction values. As discussed herein, the skew correction values may be obtained using a skew correction vernier printed on a print medium, which may reduce or eliminate costly mechanisms for mechanical correction of image placement errors or optical sensors for image detection.

A vernier (also referred to herein as a vernier scale) may include two scales printed on the print medium, each having a different fixed spacing. The scales may be printed on the same side of the print medium and may be positioned relative to a desired edge of the print medium for skew detection (e.g., the leading edge and/or side edge). The skew correction value may be obtained by folding the print medium so that the two scales overlap and a measurement may be visually taken from the vernier scale. For example, when the print medium is folded such that respective corners (or the leading edge or side edge) are aligned and the two scales overlap with each other, a skew correction value for the leading edge may be obtained by identifying markings on two scales that most closely overlap with each other. One of the scales may include shift values that may range between a certain negative value and a certain positive value, in which a negative value may correspond to a particular negative shift value, a positive value may correspond to a particular positive shift value, and a zero value may correspond to an image that is not skewed. In other words, a zero value may correspond to the print medium, and thus the feed mechanisms, being aligned correctly with the imaging mechanisms that printed the two scales on the print medium. A print engine may use the identified skew correction value to correct for a skew in the print medium during printing onto the print medium.

By using a vernier to obtain skew correction values as disclosed herein, imaging devices may be fabricated without complex components (e.g., a mechanism for mechanical alignment of print media and/or optical sensors) for automatically detecting and correcting for skew may not be needed. As a result, the imaging devices may be fabricated with fewer mechanical components, which may enable the imaging devices to operate in a relatively efficient and simple manner. This may also result in the imaging devices consuming a lower amount of energy while still enabling for skew correction during printing operations.

Figure 2:
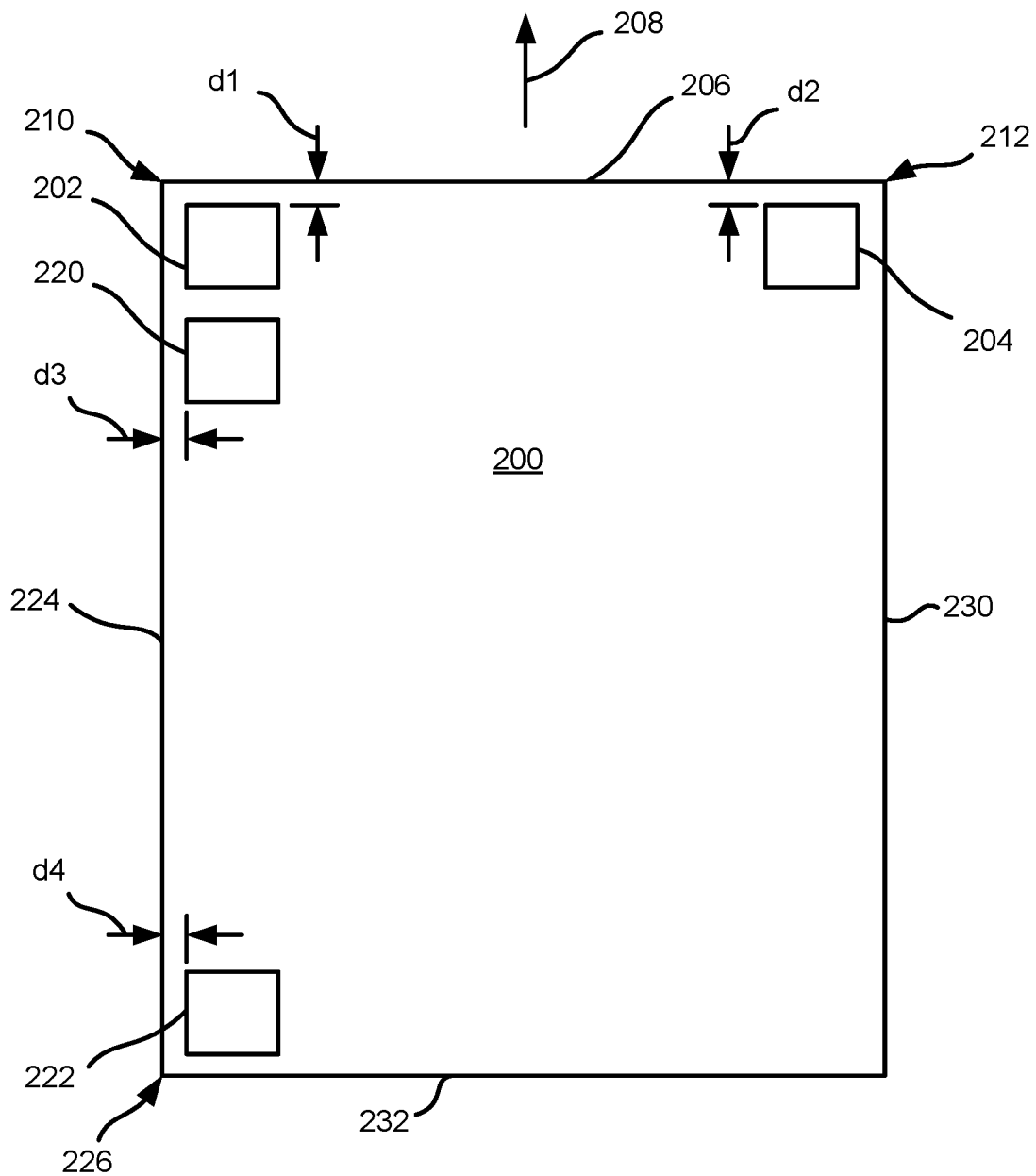
FIG. 2 depicts an example print medium on which the example apparatus depicted in FIG. 1 may print indicia that may correlate to a skew correction value for a first edge of the print medium.

Reference is first made to FIGS. 1 and 2. FIG. 1 depicts a block diagram of an example apparatus 100 that may print indicia on a print medium, in which the indicia may indicate a skew correction value that may be used to identify a level of skew in the print medium. FIG. 2 depicts an example print medium 200 on which the example apparatus 100 depicted in FIG. 1 may print indicia that may correlate to a skew correction value for a first edge of the print medium. It should be understood that the example apparatus 100 depicted in FIG. 1 and the example print medium 200 depicted in FIG. 2 may include additional features and that some of the features described herein may be removed and/or modified without departing from the scopes of the apparatus 100 or print medium 200.

The apparatus 100 may be a computing device, a server computer, a laptop computer, or the like. In other examples, the apparatus 100 may be part of an imaging device, such as a printer, a multifunction machine, or the like. In any of these examples, the apparatus 100 may control operations of the imaging device to, for instance, print indicia on a print medium for skew correction. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device.

The apparatus 100 may also include a non-transitory computer readable medium 110 that may have stored thereon machine readable instructions 112-114 (which may also be termed computer readable instructions) that the processor 102 may execute. The non-transitory computer readable medium 110 may be an electronic, magnetic, optical, or other physical storage device that includes or stores executable instructions, where the term "non-transitory" does not encompass transitory propagating signals. The non-transitory computer readable medium 110 may be, for example, Random Access memory (RAM), an Electrically Erasable Programmable Read-Only Memory (EEPROM), a storage device, an optical disc, and the like. The non-transitory computer readable medium 110 may also be referred to as a memory.

In some examples, instead of the non-transitory computer readable medium 110, the apparatus 100 may include hardware logic blocks that may perform functions similar to the instructions 112-114. In yet other examples, the apparatus 100 may include a combination of instructions and hardware logic blocks to implement or execute functions corresponding to the instructions 112-114. In any of these examples, the processor 102 may implement the hardware logic blocks and/or execute the instructions 112-114. As discussed herein, the apparatus 100 may also include additional instructions and/or hardware logic blocks such that the processor 102 may execute operations in addition to or in place of those discussed above with respect to FIGS. 1 and 2.

As shown in FIG. 1, the processor 102 may fetch, decode, and execute the instructions 112 to print a first indicia 202 at a first region on a first side of a print medium 200. In addition, the processor 102 may fetch, decode, and execute the instructions 114 to print a second indicia 204 at a second region on the first side of the print medium 200. The second region may be spaced a prescribed distance from the first region along a first edge 206 of the print medium 200. In addition, a relative position of the first indicia 202 to the second indicia 204 may correlate to a skew correction value for the first edge 206 of the print medium 200 as discussed herein.

According to examples, the print medium 200 may be fed through an imaging device in a direction indicated by the arrow 208. In addition, as the print medium 200 is fed through the imaging device, the processor 102 may control an imaging component, such as an inkjet printhead, a toner application mechanism, or the like, to print the first indicia 202 and the second indicia 204. As depicted in FIG. 2, and by way of particular example, the first indicia 202 may be printed at an upper left region of the print medium 200 near a first corner 210 of the print medium 200 and the second indicia 204 may be printed at an upper right region of the print medium 200 near a second corner 212 of the print medium 200.

The first indicia 202 and the second indicia 204 may form a pair of indicia that together enable measurement of a skew correction value for a particular edge of the print medium 200. For example, an edge of the print medium 200 in the feed direction (e.g., 208) may be referred to as a leading edge 206. The first indicia 202 may be printed at a distance d1 from the leading edge 206 and the second indicia 204 may be printed at a distance d2 from the leading edge 206, as illustrated in FIG. 2. When the print medium 200 is properly aligned to the imaging components, e.g., fed parallel to the feed direction 208, the distance d1 and the distance d2 may be equal to each other. However, when the print medium 200 is not properly aligned to the imaging components, e.g., fed at an angle with respect to the feed direction 208, the distance d1 may differ from the distance d2. As a result, a difference between d1 and d2 may indicate a placement error of the print medium 200. In addition, the difference between the distances d1 and d2 may correlate to an amount of skew or image twist that may result in the misaligned print medium 200.

In some examples, the print medium 200 may include a third indicia 220 and a fourth indicia 222 printed relative to a side edge 224 for measuring skew correction values relative to the side edge 224. The third indicia 220 may be printed in a region adjacent to the first corner 210 at a distance d3 from the side edge 224, and the second indicia 204 may be printed in a region adjacent to a third corner 226 at a distance d4 from the side edge 224. When the print medium 200 is properly aligned to the imaging components, e.g., fed parallel to the feed direction 208, the distance d3 and the distance d4 may be equal to each other. However, when the print medium 200 is not properly aligned to the imaging components, e.g., fed at an angle with respect to the feed direction 208, the distance d3 may differ from the distance d4. As a result, a difference between d3 and d4 may indicate a placement error of print medium 200 and may correlate to an amount of skew or image twist that may result in the misaligned print medium 200.

Figure 3:
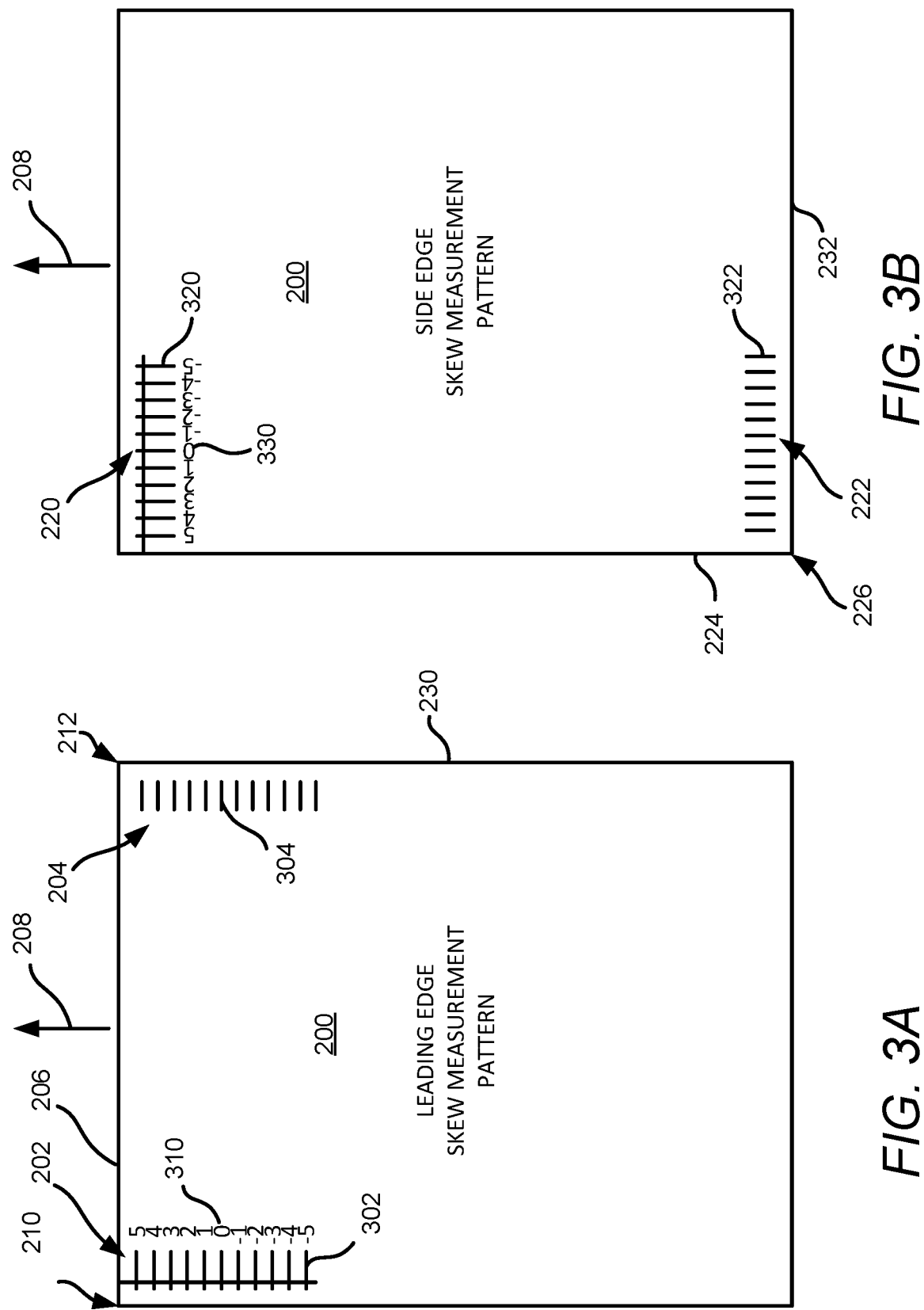
FIG. 3A depicts an example print medium including a vernier for determining a skew correction value relative to a leading edge of a print medium.
FIG. 3B depicts an example print medium including a vernier for determining a skew correction value relative to a side edge of a print medium.

The first indicia 202 and the second indicia 204 may be part of a vernier (also referred to herein as a vernier scale). In other words, the first indicia 202 and the second indicia 204 may be printed to have respective scales 302, 304 as shown in FIG. 3A, in which the first scale 302 of the first indicia 202 differs from the second scale 304 of the second indicia 204. As shown in FIG. 3A, the first and second scales 302, 304 may include respective markings, which may be lines or another appropriate type of indication, and may be disposed to be substantially parallel to the leading edge 206 and arranged in a direction substantially perpendicular to the leading edge 206. The markings of the first and second scales 302, 304 may be graduated at different spacings with respect to each other to form a vernier scale.

Generally speaking, a vernier (vernier scale) may provide visual indications that may enable more accurate measurement readings than may be possible by human estimation. The vernier scale may include a main scale and a subsidiary scale that is positioned relative to the main scale. The relative positions and spacings of the subsidiary scale to the main scale may enable increased resolution of measurement readings using mechanical interpolation. For example, in FIG. 3A, the first scale 302 may be a main scale having markings that have a first fixed spacing and the second scale 304 may be a subsidiary scale (vernier) having markings that have a second fixed spacing that is different from the first fixed spacing. In some examples, the second indicia 204 (e.g., subsidiary scale 304 or vernier) may have 10 divisions equal in distance to 9 divisions on the first indicia 202 (e.g., main scale 302). In other examples, the second indicia 204 and the first indicia 202 may have other divisions.

As shown in FIG. 3A, the first and second scales 302 and 304 may be printed on a common side of the print medium 200 with respect to each other and may be positioned relative to a desired edge, e.g., the leading edge 206, of the print medium 200 for skew detection. The first scale 302 may also be printed with skew correction values 310 that may be used to determine the level of skew occurring in print medium 200 during an imaging operation on the print medium 200. As shown, the skew correction values 310 may range between a certain negative value (−5) and a certain positive value (5), in which a negative value may correspond to a particular negative shift value, a positive value may correspond to a particular positive shift value, and a zero value may correspond to an image that is not skewed. It should be noted that the values shown in FIG. 3A for the skew correction values 310 are for purposes of illustration and should thus not be construed as limiting the present disclosure to those values.

The level of skew may be obtained by folding the print medium 200 such that the two scales 302, 304 overlap each other. A measurement from the vernier scale (skew correction values 310) may then be determined. For example, when the print medium 200 is folded such that respective corners are aligned and the first and second scales 302, 304 overlap each other, a level of skew for the leading edge 206 may be obtained by identifying the markings on the first and second scales 302, 304 that most closely overlap with each other. In addition, the skew correction value 310 corresponding to the markings of the first and second scales 302, 304 that most closely overlap with each other may be read and may be identified as denoting the level of skew for the leading edge 206. Similarly, the value 310 corresponding to the markings in the scales 302, 304 that most closely overlap with each other may identify a level of shift that is to be applied to a print medium to compensate for the identified skew. As noted herein, when the value 310 is "0", a shift may not be needed as the scales 302, 304 may be considered as being aligned with each other.

As shown in FIG. 3B, the third indicia 220 and the fourth indicia 222 may be part of a vernier and may thus be printed to have a third scale 320 and a fourth scale 322, respectively. Similarly to the first and second scales 302, 304, the third and fourth scales 320, 322 of the third indicia 220 and the fourth indicia 222 may differ from each other. In addition, the third and fourth scales 320, 322 may include respective markings, which may be lines or another appropriate type of indication, and may be disposed to be substantially parallel to the side edge 224 and arranged in a direction substantially perpendicular to the side edge 224. The markings of the third and fourth scales 320, 322 may be graduated at different spacings with respect to each other to form a vernier scale. In addition, third scale 320 may be a main scale and the fourth scale 322 may be a subsidiary scale of the vernier scale. The third scale 320 may have markings that have a first fixed spacing and the fourth scale 322 may be a subsidiary scale (vernier) having markings that have a second fixed spacing that is different from the first fixed spacing. In some examples, the fourth indicia 222 (e.g., subsidiary scale 322 or vernier) may have 10 divisions equal in distance to 9 divisions on the third indicia 220 (e.g., main scale 320). In other examples, the fourth indicia 222 and the third indicia 220 may have other divisions.

As shown in FIG. 3B, the third scale 320 and the fourth scale 322 may be printed on a common side of the print medium 200 with respect to each other and may be positioned relative to a desired edge, e.g., the side edge 224, of the print medium 200 for skew detection. The third scale 320 may also be printed with skew correction values 330 that may be used to determine the level of skew occurring in print medium 200 during an imaging operation on the print medium 200. It should be noted that the values shown in FIG. 3B for the skew correction values 330 are for purposes of illustration and should thus not be construed as limiting the present disclosure to those values. The level of skew may be obtained by folding the print medium 200 such that the third and fourth scales 320, 322 overlap each other. A measurement from the vernier scale may then be determined. For example, when the print medium 200 is folded so that respective corners are aligned and the third and fourth scales 320, 322 overlap each other, a level of skew for the side edge 224 may be obtained by identifying the markings on the third and fourth scales 320, 322 that most closely overlap with each other. In addition, the skew correction value 330 corresponding to the markings of the third and fourth scales 320, 322 that most closely overlap with each other may be read and may be identified as denoting the level of skew for the side edge 224. Similarly, the value 330 corresponding to the markings in the scales 320, 322 that most closely overlap with each other may identify a level of shift that is to be applied to a print medium to compensate for the identified skew. As noted herein, when the value 330 is "0", a shift may not be needed as the scales 320, 322 may be considered as being aligned with each other.

Figures 4, 5:
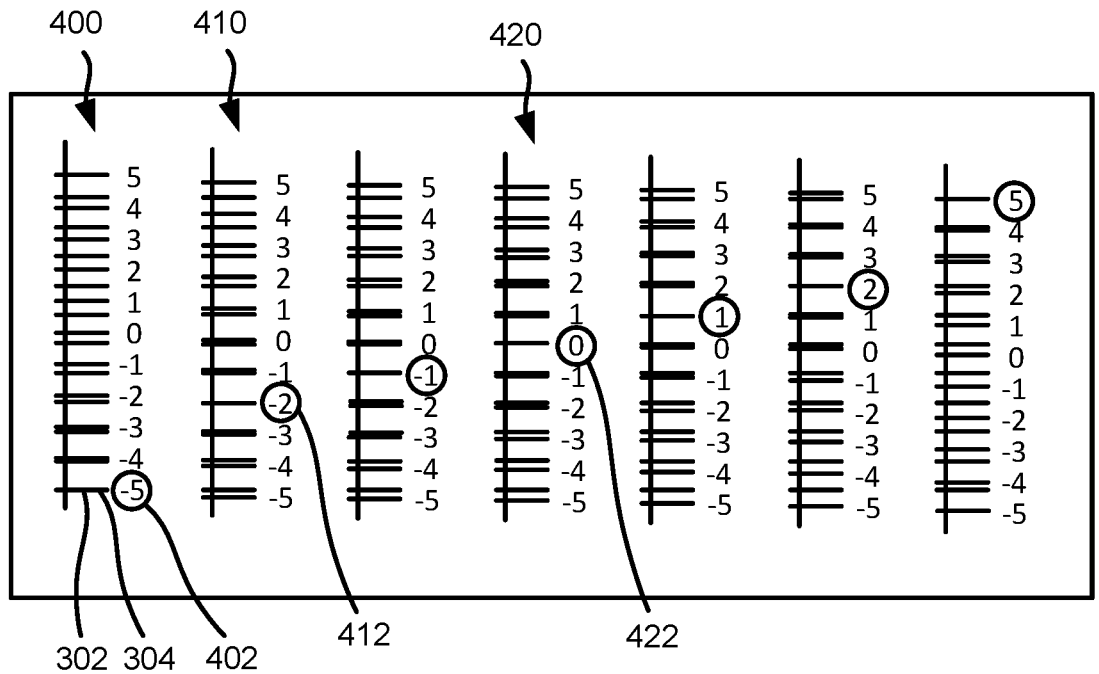
FIG. 4 depicts examples of different levels of overlap between pairs of scales that may be observed when a print medium including the example verniers disclosed herein is folded.
FIG. 5 depicts shows a flow diagram of an example method for printing a first scale and a second scale for determining a skew correction value.

Various examples of different levels of overlap between the pair of first and second scales 302, 304 (or equivalently, the third and fourth scales 320, 322) are depicted in FIG. 4. As shown in FIG. 4, a vernier scale 400 may be formed when the print medium 200 is folded such that the markings of the second scale 304 overlap the markings of the first scale 302. The vernier scale 400 may be visible through the folded print medium 200. In some examples, the folded print medium 200 may be held up to a light source (not shown) to improve visibility of the vernier scale 400. It should be understood that the description of the vernier scale 400 pertaining to the first and second scales 302, 304 to determine the level of skew of a leading edge 206 may equally pertain to the third and fourth scales 320, 322 to determine the level of skew of a side edge 224 of the print medium 200.

When folded, each of the markings on the first scale 302 may form a pair with a marking on the second scale 304. A pair of markings that most closely overlaps each other may correspond to a skew correction value for the print medium 300. In the examples shown in FIG. 4, in the leftmost vernier scale 400, the bottommost markings of the first scale 302 and the second scale 304 are shown as most closely overlapping each other. As a result, an amount of skew of the leading edge 206 may be associated with a skew correction value of −5 as indicated by the label 402. In the vernier scale 410, the markings corresponding to the skew correction value of −2 are depicted as most closely overlapping each other. As a result, an amount of skew of the leading edge 206 may be associated with a skew correction value of −2 as indicated by the label 412. In the vernier scale 420, the markings corresponding to the skew correction value of 0 are depicted as most closely overlapping each other. As a result, an amount of skew of the leading edge 206 may be associated with a skew correction value of 0 as indicated by the label 422, which may mean that the leading edge 206 is not skewed or is slightly skewed with respect to the imaging components. The remaining verniers in FIG. 4 show different levels of skew.

To determine the level of skew along the leading edge 206, the print medium 200 may be folded vertically inward such that the second corner 212 overlaps the first corner 210 and the leading edge 206 is aligned, e.g., collinear. In some examples, the first indicia 202 and/or the second indicia 204 may be printed in regions near opposite edges of the print medium 200 (e.g., near corners 210, 212) or away from the first and/or second corners 210, 212. For example, the first indicia 202 may be positioned near the first corner 210 while the second indicia 204 may be positioned near a center of the print medium 200, while being at a distance d2 from the leading edge 206. In this case, the print medium 200 may be folded such that the first indicia 202 is overlapped with the second indicia 204 while ensuring that overlapped portions of the leading edge 206 are collinear. Accuracy of the measurement from the vernier scale may depend on the distance between the pair of indicia 202, 204 as well as how accurately the overlapped portions of the leading edge 206 are aligned.

Similarly, the print medium 200 may be folded horizontally inward so that the third corner 226 overlaps the first corner 210 and the side edge 224 is aligned, e.g., collinear. In some examples, the third indicia 220 and/or the fourth indicia 222 may be printed in regions near opposite edges of the print medium 200 (e.g., near corners 210, 222) or away from the first and/or third corners 210, 226. For example, the third indicia 220 may be positioned near the first corner 210 while the fourth indicia 222 may be positioned near a center of the print medium 200, while being at a distance d4 from the side edge 224. In this case, the print medium 200 may be folded such that the third indicia 220 is overlapped with the fourth indicia 222 while ensuring that overlapped portions of the side edge 224 are collinear. Accuracy of the measurement from the vernier scale may depend on the distance between the pair of indicia 220, 222 as well as how accurately the overlapped portions of the side edge 224 are aligned.

In some examples, the vernier for the leading edge 206 (e.g., indicia 202, 204) may be printed together with the vernier for the side edge 224 (e.g., indicia 220, 222). In these examples, the third indicia 220 may be positioned adjacent to the first indicia 202 as illustrated in FIG. 2, or positioned at other locations along the side edge 224. In addition, verniers for the leading edge 206 and the side edge 224 may be printed together to, for instance, determine skew correction values for both the leading edge 206 and the side edge 224 concurrently.

The skew correction value 310 and/or 330 corresponding to the most closely overlapping markings may be identified as discussed herein with respect to FIG. 4. According to examples, the identified skew correction value 310 or 330 may be entered into an imaging device for the imaging device to apply the identified skew correction value 310 or 330 during imaging on a subsequent print medium. For instance, the imaging device may digitally compensate for the skew according to the identified skew correction value 310, 330 by, for instance, modifying the placement of printing fluid, toner, or the like, onto the print medium in a future job to correct for the skew in the print medium. In some examples, a user may enter the identified skew correction value 310, 330 into the imaging device via, for instance, a control panel of the imaging device, a computing device external to the imaging device, or the like.

Various manners in which the processor 102 may operate are discussed in greater detail with respect to the method 500 depicted in FIG. 5. Particularly, FIG. 5 depicts a flow diagram of an example method 500 for printing a vernier scale to obtain a skew correction value of a printing medium 200. It should be understood that the method 500 depicted in FIG. 5 may include additional operations and that some of the operations described therein may be removed and/or modified without departing from the scope of the method 500. The description of the method 500 is made with reference to the features depicted in FIGS. 1-4 for purposes of illustration.

At block 502, the processor 102 may print a first scale 302 on a first side of a print medium 200. At block 504, the processor 102 may print a second scale 304 on the first side of the print medium 200. The processor 102 may print the second scale 304 to be aligned with the first scale 302 along a common axis. As discussed herein, the second scale 304 may have a different spacing than the first scale 302 to form a vernier scale such that the first scale 302 may overlap the second scale 304 when the print medium 200 is folded along a leading edge 206 of the print medium 200 to a position in which a first portion of the leading edge 206 is collinear with a second portion of the leading edge 206. In some examples, multiple degrees of overlap between the first scale 302 and the second scale 304 may correlate to respective skew correction values 310 for the leading edge 206 of the print medium 200. The level of skew of the leading edge 206 of the print medium 200 may be determined as discussed above with respect to FIG. 4.

In some examples, the processor 102 may additionally or alternatively print a third scale 320 and a fourth scale 322 on the print medium 200. The fourth scale 322 may be aligned with the third scale 320 along another common axis. As discussed herein, the fourth scale 322 may have a different spacing than the third scale 322 to form another vernier scale. In some examples, the processor 102 may print the third scale 320 to overlap the fourth scale 322 when the print medium 200 is folded along a second edge 224 of the print medium 200 to a position in which a first portion of the second edge 224 is collinear with a second portion of the second edge 224. As discussed herein, multiple degrees of overlap between the third scale 320 and the fourth scale 322 may correlate to respective skew correction values 330 for the second edge 224 of the print medium 200. The level of skew of the second edge 224 of the print medium 200 may be determined as discussed above with respect to FIG. 4.

Some or all of the operations set forth in the method 500 may be included as utilities, programs, or subprograms, in any desired computer accessible medium. In addition, the method 500 may be embodied by computer programs, which may exist in a variety of forms. For example, the method 500 may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 6, there is shown a block diagram of an example computer readable medium 600 that may have stored thereon machine readable instructions that when executed by a processor, may cause a print engine to print a vernier on a print medium 200 for determining a skew correction value for the print medium 200. It should be understood that the computer readable medium 600 depicted in FIG. 6 may include additional instructions and that some of the instructions described herein may be removed and/or modified without departing from the scope of the computer readable medium 600 disclosed herein. The computer readable medium 600 may be a non-transitory computer readable medium. The term "non-transitory" does not encompass transitory propagating signals.

The computer readable medium 600 may have stored thereon machine readable instructions 602 that a processor, such as the processor 102, depicted in FIG. 1, may execute. The computer readable medium 600 may be an electronic, magnetic, optical, or other physical storage device that includes or stores executable instructions. The computer readable medium 600 may be, for example, Random Access memory (RAM), an Electrically Erasable Programmable Read-Only Memory (EEPROM), a storage device, an optical disc, and the like.

The processor may fetch, decode, and execute the instructions 602 to cause a print engine (e.g., of an imaging device) to print a first scale 302 of a vernier on a first side of a print medium 200. The first scale 302 may be positioned near a side edge 224 of the print medium 200 and may have a plurality of first markings. The processor may fetch, decode, and execute the instructions 604 to cause the print engine to print a second scale 304 of the vernier on the first side of the print medium 200 positioned near a second edge 230 of the print medium 200. The second scale 304 may be aligned with the first scale 302 along a common axis and may have a plurality of second markings. The second scale 304 may have a different spacing than the first scale 302.

In some examples, the first scale 302 may overlap the second scale 304 when the print medium 200 is folded to a position along a leading edge 206 of the print medium 200 in which a first portion of the leading edge 206 is collinear with a second portion of the leading edge 206. A skew correction value 310 of the leading edge 206 of the print medium 200 may correlate to a pair of a first marking and a second marking that most closely overlaps each other while the print medium 200 is folded along the leading edge 206 as discussed herein.

The processor may fetch, decode, and execute the instructions 606 to cause the print engine to print a third scale 320 of a second vernier on the first side of the print medium 200. The third scale 320 may be positioned near a leading edge 206 of the print medium 200 and may have a plurality of third markings. The processor may fetch, decode, and execute the instructions 608 to cause the print engine to print a fourth scale 322 of the second vernier on the first side of the print medium 200 positioned near a trailing edge 232 of the print medium 200. The fourth scale 322 may be aligned with the third scale 320 along a common axis and may have a plurality of fourth markings. The fourth scale 322 may have a different spacing than the third scale 320.

In some examples, the third scale 320 may overlap the fourth scale 322 when the print medium 200 is folded to a position along a side edge 224 of the print medium 200 in which a first portion of the side edge 224 is collinear with a second portion of the side edge 224. A skew correction value 330 of the side edge 224 of the print medium 200 may correlate to a pair of a third marking and a fourth marking that most closely overlaps each other while the print medium 200 is folded along the side edge 224 as discussed herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that, when executed by the processor, cause the processor to:
      print a first indicia at a first region on a first side of a print medium, the first indicia including a plurality of first markings for a first scale; and
      print a second indicia at a second region on the first side of the print medium, the second indicia including a plurality of second markings for a second scale, the first scale having a different spacing than the second scale, and the second region being spaced a prescribed distance from the first region along a first edge of the print medium, wherein a relative position of the first indicia to the second indicia correlates to a skew correction value for the first edge of the print medium, wherein the skew correction value of the first edge of the print medium correlates to a pair of a first marking among the plurality of first markings and a second marking among the plurality of second markings that is closest to each other while the print medium is folded along the first edge.

2. The apparatus of claim 1, wherein the plurality of first markings having a first fixed spacing and the plurality of second markings having a second fixed spacing, the second fixed spacing being different than the first fixed spacing.

3. The apparatus of claim 2, wherein each of the plurality of first markings is associated with a respective one of the plurality of second markings to form a plurality of pairs, and each the plurality of pairs of first and second markings correlates to a different skew correction value.

4. The apparatus of claim 3, wherein the first indicia and the second indicia are to overlap each other when the print medium is folded to a position in which a first portion of the first edge is collinear with a second portion of the first edge.

5. The apparatus of claim 4, wherein the instructions are further to cause the processor to:
   print skew correlation values correlated to the first scale along respective first markings.

6. The apparatus of claim 2, wherein the plurality of first markings are lines.

7. The apparatus of claim 6, wherein each of the lines extends in a direction that is substantially parallel to the first edge of the print medium and are arranged along a direction that is substantially perpendicular to the first edge of the print medium.

8. The apparatus of claim 2, wherein the instructions are further to cause the processor to:
obtain the skew correction value based on the relative positions of the first markings to the second markings; and
apply the skew correction value for another print medium.

9. The apparatus of claim 1, wherein the first indicia and the second indicia are positioned to be aligned substantially parallel to the first edge and near opposite edges of the print medium.

10. The apparatus of claim 1, wherein the instructions are further to cause the processor to:
print a third indicia and a fourth indicia on the print medium, the third indicia and the fourth indicia being correlated with a skew correction value for a second edge of the print medium that is perpendicular to the first edge;
wherein the first edge is a leading edge of the print medium and the skew correction value for the first edge correlates to an amount of skew of the leading edge of the print medium; and
wherein the second edge is a side edge of the print medium and the skew correction value for the second edge correlates to an amount of skew of the side edge of the print medium.

11. A method comprising:
printing, by a processor, a first scale on a first side of a print medium; and
printing, by the processor, a second scale on the first side of the print medium, the second scale being aligned with the first scale along a common axis, and the second scale having a different spacing than the first scale;
wherein the first scale is to overlap the second scale when the print medium is folded along a first edge of the print medium to a position in which a first portion of the first edge is collinear with a second portion of the first edge, and wherein multiple degrees of overlap between the first scale and the second scale correlate to respective skew correction values for the first edge of the print medium.

12. The method of claim 11, wherein the first scale includes a plurality of first markings having a first spacing and the second scale includes a plurality of second markings having a second spacing, the second spacing being different than the first spacing, and wherein a skew correction value for the first edge of the print medium correlates to a pair of a first marking and a second marking that most closely overlaps each other.

13. The method of claim 11, further comprising:
printing a third scale on the print medium; and
printing a fourth scale on the print medium, the fourth scale being aligned with the third scale along another common axis, the fourth scale having a different spacing than the third scale;
wherein the third scale is to overlap the fourth scale when the print medium is folded along a second edge of the print medium to a position in which a first portion of the second edge is collinear with a second portion of the second edge, and wherein multiple degrees of overlap between the third scale and the fourth scale correlate to respective skew correction values for the second edge of the print medium.

14. A non-transitory computer readable medium on which is stored machine readable instructions that when executed by a processor, cause a print engine to:
print a first scale of a vernier on a first side of a print medium, the first scale being positioned near a first edge of the print medium and having a plurality of first markings; and
print a second scale of the vernier on the first side of the print medium, the second scale being positioned near a second side of the print medium and being aligned with the first scale along a common axis and having a plurality of second markings, the second scale having a different spacing than the first scale, wherein the first scale is to overlap the second scale when the print medium is folded to a position along a first edge of the print medium in which a first portion of the first edge is collinear with a second portion of the first edge, and wherein a skew correction value of the first edge of the print medium correlates to a pair of a first marking among the plurality of first markings and a second marking among the plurality of second markings that most closely overlaps each other while the print medium is folded along the first edge.

15. The non-transitory computer readable medium of claim 14, wherein the instructions are further to cause the processor to cause a print engine to:
print a third scale of a second vernier on the first side of the print medium, the third scale having a plurality of third markings; and
print a fourth scale of the second vernier on the first side of the print medium, the fourth scale being aligned with the third scale along another common axis and having a plurality of fourth markings, the fourth scale having a different spacing than the third scale;
wherein the third scale is to overlap the fourth scale when the print medium is folded to a position along a second edge of the print medium in which a first portion of the second edge is collinear with a second portion of the second edge, and wherein a skew correction value of the second edge of the print medium correlates to a pair of a third marking and a fourth marking that most closely overlaps each other while the print medium is folded along the second edge.

* * * * *